UNITED STATES PATENT OFFICE.

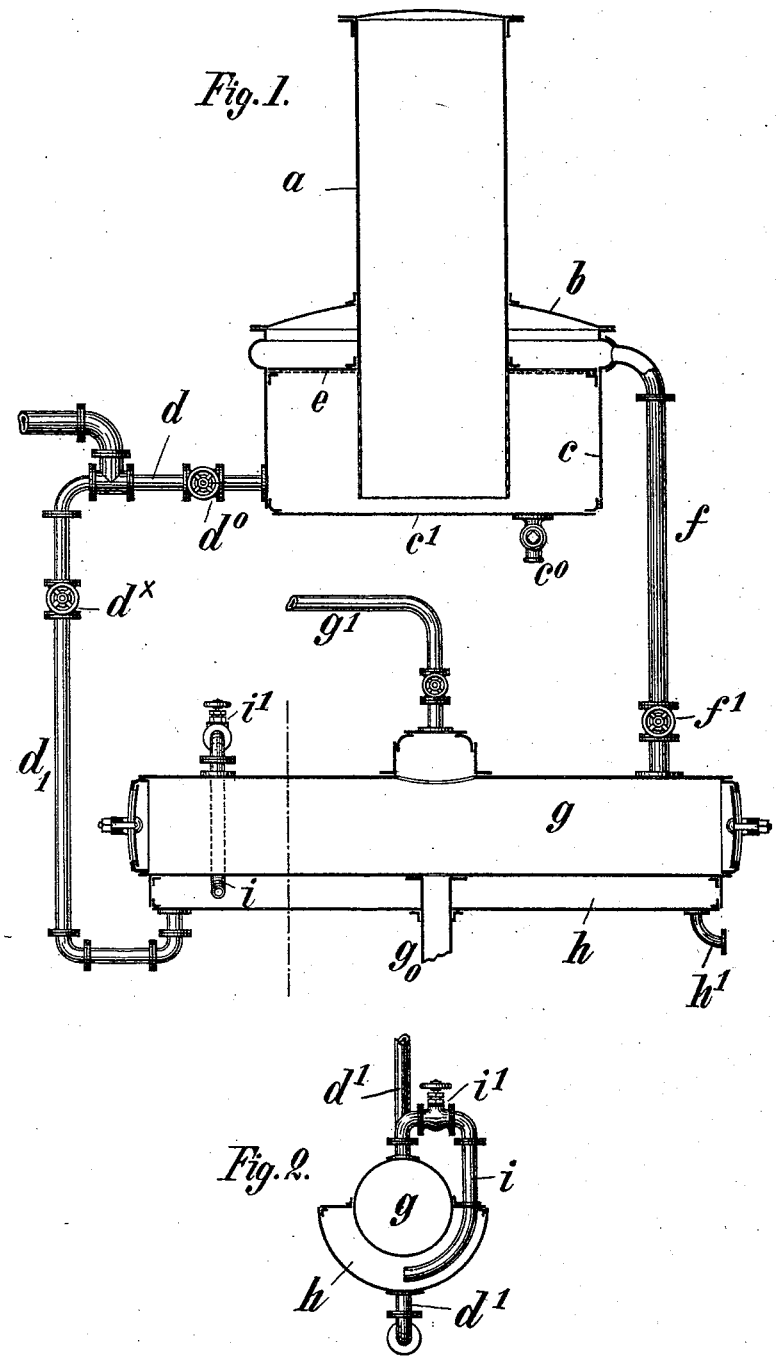

LUDWIG KERN, OF HAMBURG, GERMANY.

PRODUCTION OF ADHESIVES.

SPECIFICATION forming part of Letters Patent No. 487,928, dated December 13, 1892.

Application filed August 31, 1892. Serial No. 444,612. (No model.) Patented in England December 7, 1891, No. 21,370.

*To all whom it may concern:*

Be it known that I, LUDWIG KERN, a subject of the German Emperor, residing at Hamburg, in the German Empire, have invented certain new and useful Improvements in the Production of Adhesives, (for which I have obtained a patent in Great Britain, No. 21,370, bearing date December 7, 1891,) of which the following is a specification.

This invention relates to improvements in the production of adhesives or agglutinants in the form and qualities of gum-arabic from such vegetable secretions which exude from almond, cherry, peach, plum, and other trees, and which are in their natural state not soluble in water; and the object of my invention is thoroughly to purify such exudation and make the same soluble in water in order to render it applicable for the purposes mentioned. I attain this object by first grinding the hard brittle gum generally found at the foot of the said trees in big lumps mixed with earth and other impurities, which are to be separated by bolting, and then steeping the meal so obtained in a solution of sulphuric or muriatic acid, peroxide of hydrogen, and magnesia usta until a gelatinous mass is obtained. This is then run into an autoclave and there exposed to the action of steam at a pressure of from fifteen to ninety pounds per square inch for about fifteen minutes to one hour, whereupon the mass is forced through a narrow meshy screen or a filter preferably combined with the autoclave; or it may be forced under a considerably - reduced pressure through a filter-press the frames of which are lined with narrow woven cloths. The filtrate thus obtained is conducted into an evaporating apparatus, in which the same is freed from the largest portion of the water combined therewith at a moderate but uniform temperature. The viscid mass so obtained is finally dried on galvanized or enameled iron sheets, which have been previously covered with a film of grease, oil, or any other fatty matter, to facilitate the removal of the dry, hard, brittle substance thus obtained and which possesses all the properties of the genuine gum-arabic.

In carrying the said invention into practice I preferably employ an autoclave of peculiar construction in combination with an evaporating apparatus, illustrated in the accompanying drawings, in which—

Figure 1 is a sectional elevation of my combined apparatus, and Fig. 2 a cross-section of the evaporating apparatus.

Similar letters refer to similar parts throughout both views.

The gelatinous mass obtained, as aforesaid, by steeping the pulverized gum of the said trees in an aqueous solution of about fifteen parts sulphuric or muriatic acid, sixteen parts peroxide of hydrogen, and eighty parts of magnesia usta is run into the centrally-arranged supply-tube $a$, passing through the cover $b$ of the vessel $c$ of the autoclave. The lower open end of the supply-tube reaches close to the bottom $c'$ of the vessel $c$, while its upper air-tight closed end extends a certain height beyond the cover $b$, so as to allow the mass to automatically descend by its gravity in the proportion as the mass dissolved by high-pressure steam is discharged from the vessel $c$. Within this autoclave is arranged a screen $e$, surrounding the supply-tube $a$ and adapted to retain the non-dissolved portions and impurities of the gelatinous mass within the lower part of the autoclave. Above the screen $e$ branches a pipe $f$ to a cylindrical vessel or evaporator $g$, partly surrounded by a steam-jacket $h$, and designed to receive the dissolved viscid mass, having passed the screen $e$, and to aid the evaporation of a large part of the water combined therewith. For this reason the evaporator $g$ is heated by steam distributed through the pipe $d'$ from the main steam-pipe $d$, through which high-pressure steam is supplied to the autoclave $c$, and it further communicates through a pipe $g'$ either with the free atmosphere or with an air-pump or exhauster carrying away the vapor raised within the vessel $g$. The latter may be also connected through a pipe $i$ with the semi-annular space $h$ in order to allow part of the vapors to enter the steam-jacket when first starting the operation, and to drive out the air contained in the same. The condensed water is led through a siphon $h'$ to a steam-trap of ordinary type.

The operation of this apparatus will be as follows: When the vessel $c$ and the supply-funnel $a$ are filled with the gelatinous mass of gum obtained as aforesaid and the funnel $a$ hermetically shut up, high-pressure steam is admitted to enter the vessel $c$ by opening the stop-valve $d'$ of the steam-pipe $d$. If the mass has been exposed a considerable time to the action of steam, the thus-dissolved viscid mass, together with water formed by the condensing of the steam, is forced through the screen $e$ as soon as the steam-valve $d°$ is partly or entirely shut up and the stop-valve $f'$ of the pipe $f$ opened. The mass thus conducted into the vessel $g$ is freed therein from a part of its water by aid of steam admitted to enter the steam-jacket after opening the stop-valve $d^\times$ of the pipe $d'$ and as soon as the valve $i'$ of the pipe $i$ has been closed. The vapor raised in the vessel $g$ escapes through the pipe $g'$, and the viscid mass retained in the vessel $g$ is carried through the meanwhile-opened bottom pipe $g°$ to a drying-room, where the drying is completed on galvanized or enameled iron sheets, in order to produce a hard brittle substance which possesses all the properties of the genuine arabic gum. When handling the valves $d°$ $d^\times$ and $f'$ in a proper manner, a continuous action of the apparatus described is performed, the much the more as a cleaning of the apparatus may be easily performed by passing steam through all parts of the same. Impurities settling at the bottom of the vessel $c$ may be easily drawn off through the faucet $c°$.

The employment of an aqueous solution of the kind and in the proportions as herein set forth serves the purpose on the one part to aid the solubility of the resinous matters employed and on the other part to absorb the color contained therein.

It must be observed that in the course of the herein-described process the substance thus heated will not come in contact with a metal which by means of its oxide is fit to change the light translucent color of the end product. For this reason all iron surfaces of the apparatus employed which come in contact with the mass may be galvanized or lined with enamel and the disintegration of the gum may be performed between stone, porcelain, or other non-metallic surfaces.

Having fully described my invention, what I claim, and desire to protect by Letters Patent, is—

1. The process of producing adhesive substances soluble in water from resinous substances, such as described, which consists in steeping the pulverized resinous substances in an aqueous solution of sulphuric and muriatic acid, peroxide of hydrogen, and magnesia usta, subjecting the material to the action of steam under pressure, filtering and drying the same, substantially as and for the purpose set forth.

2. The combination of an autoclave, a feed-duct extending nearly to the bottom thereof, an evaporator, a tubular connection between the evaporator and autoclave, a filtering medium interposed in the passage for the solution from the autoclave to the evaporator, and means for supplying heat to said autoclave and evaporator, substantially as and for the purpose set forth.

3. The combination of an autoclave, a feed-duct extending nearly to the bottom thereof and having a portion within the autoclave perforated, a filtering medium within the autoclave above the perforated portion of the feed-duct, an evaporator, a valved conduit connecting the autoclave above said filtering medium with the evaporator, and means for supplying heat to said autoclave and evaporator, substantially as and for the purpose set forth.

4. The combination of an autoclave, a feed-duct extending nearly to the bottom thereof, an evaporator provided with a steam-jacket, a tubular connection between the autoclave and evaporator, a filtering medium interposed in the passage of the solution from the autoclave to the evaporator, and valved steam-supply pipes for supplying steam to said autoclave and evaporator-jacket, substantially as and for the purpose set forth.

5. The combination of an autoclave, a feed-tube extending nearly to the bottom thereof, an evaporator provided with a steam-jacket, a tubular connection between the autoclave and evaporator, a filtering medium interposed in the passage of the solution from the autoclave to the evaporator, a valved pipe connecting the steam-jacket with the evaporator, and valved steam-supply pipes for supplying steam to said autoclave and evaporator-jacket, substantially as and for the purpose set forth.

In testimony that I claim the foregoing as my invention I have signed my name, in presence of two witnesses, this 5th day of August, 1892.

LUDWIG KERN.

Witnesses:
DIEDRICH PETERSEN,
HARRY F. W. GRETHE.